United States Patent [19]
Kim et al.

[11] Patent Number: 5,965,292
[45] Date of Patent: Oct. 12, 1999

[54] BATTERY TERMINAL CASE

[75] Inventors: Chan-soo Kim; Jin-soo Kim, both of Suwon, Rep. of Korea

[73] Assignee: Samsung Display Devices Co., Ltd., Kyungki, Rep. of Korea

[21] Appl. No.: 08/859,115

[22] Filed: May 20, 1997

[30] Foreign Application Priority Data

May 22, 1996 [KR] Rep. of Korea ...................... 96-17467

[51] Int. Cl.⁶ .............................. H01M 2/26; H01M 2/30
[52] U.S. Cl. .......................... 429/121; 429/65; 429/157; 429/178
[58] Field of Search .............................. 429/65, 121, 122, 429/178, 157

[56] References Cited

U.S. PATENT DOCUMENTS

| | | | |
|---|---|---|---|
| 3,986,894 | 10/1976 | Ciliberti, Jr. ........................ | 429/157 X |
| 4,002,808 | 1/1977 | Fafa ........................................ | 429/157 |
| 4,761,351 | 8/1988 | Voorn ..................................... | 429/65 X |
| 4,871,628 | 10/1989 | Parker .................................. | 429/157 X |
| 5,348,815 | 9/1994 | Barker ......................................... | 429/65 |
| 5,489,484 | 2/1996 | Wheeler et al. ..................... | 429/123 X |

*Primary Examiner*—John S. Maples
*Attorney, Agent, or Firm*—Lowe Hauptman Gopstein Gilman & Berner

[57] ABSTRACT

A battery terminal case includes an outer case into which a battery is inserted such that an anode and a portion of a cathode can of a battery can be enclosed; a cathode terminal extension member inserted into and nested inside the outer case and contacting the portion of the cathode can; and an anode terminal extension member inserted into the inside of the cathode terminal extension member and contacting the anode of the battery. Accordingly, by using the anode and cathode terminal extension members respectively contacting the anode and the cathode of the battery, damage to the battery itself can be prevented since welding is not necessary during the manufacturing of a battery pack, and contact defects between the battery and the terminal in the conventional terminal case, occurring as the elastic force of the terminal weakens, can be prevented.

9 Claims, 3 Drawing Sheets

BATTERY TERMINAL CASE

BACKGROUND OF THE INVENTION

The present invention relates to a battery terminal case, and more particularly, to a battery terminal case for preventing poor contact between the battery and contact terminals and preventing damage to the battery itself when a single battery or a plurality of batteries are used.

In general, the battery for supplying D.C. power is classified into a dry cell used for various types of electrical/electronic products as a power source, and a storage battery such as a battery for a vehicle or an interruptible power supply system. In the use of such batteries, there may be a need for a battery pack in which a plurality of batteries are connected in series to increase the voltage. FIG. 1 shows batteries connected in series according to conventional technology. As shown in the drawing, metal tab terminals 25 are welded to an anode and a cathode 21P and 22N and 22P and 23N so that batteries 21, 22 and 23 are connected in series. However, since the welding between the tab terminal 25 and the anodes and the cathodes 21P, 22P, 22N and 23N is performed at high temperature, the battery may get damaged due to heat generated during the welding.

FIG. 2 shows a conventional terminal case for loading a battery. Referring to FIG. 2, the terminal case includes a case 32 for loading a battery 31, and an anode terminal 32a and a cathode terminal 32b, installed in the case 32, the respective terminals 32a and 32b contacting the anode and the cathode of the battery 31. The anode terminal 32a is a metal piece which also applies an elastic bias to the battery 31 and the cathode terminal 32b also acts as a compression spring.

However, in such a conventional battery terminal case, the metal piece of the anode terminal 32a and the elastic force of the compression spring of the cathode terminal 32b decrease with repeated battery changes so that the contact between the respective terminals 32a and 32b and the ends of the battery 31 becomes inferior.

SUMMARY OF THE INVENTION

To overcome the above problems, it is an object of the present invention to provide a battery terminal case by which contact inferiority between a battery and a terminal and damage to the battery itself can be prevented.

Accordingly, to achieve the above object, there is provided a battery terminal case which includes an outer case into which a battery is inserted such that an anode and a portion of a cathode can of a battery can be enclosed, a cathode terminal extension member inserted into and nested inside the outer case and contacting the portion of the cathode can, and an anode terminal extension member inserted into the cathode terminal extension member and contacting the anode of the battery. It is preferable that a protruding portion is formed on the inner circumferential surface of the outer case to be inserted into and coupled with a recessed portion formed on the outer circumferential surface of the battery.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
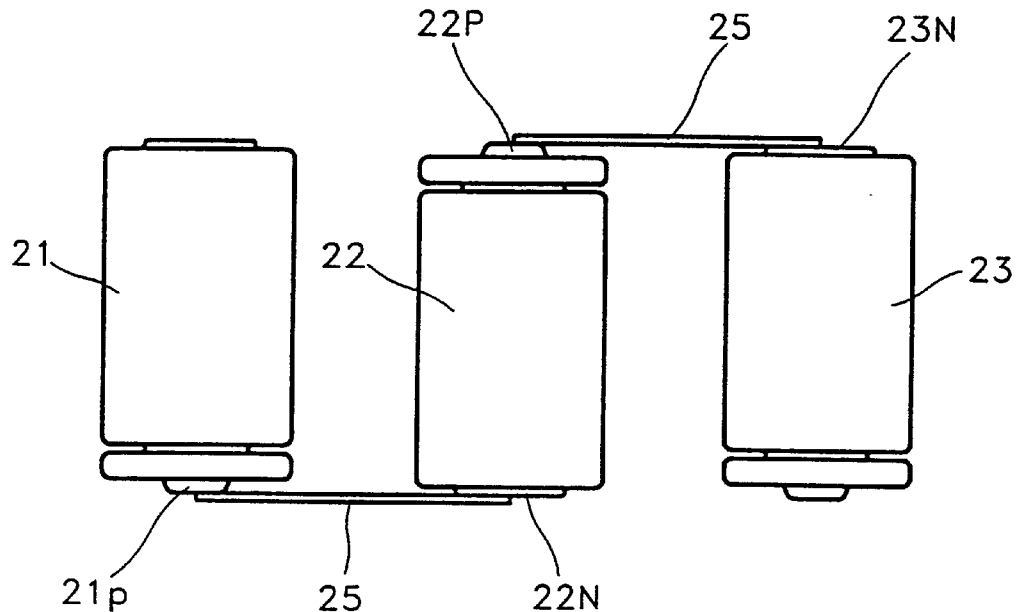
FIG. 1 is a view illustrating a plurality of batteries connected in series to form a battery pack according to the conventional technology.
Figure 2:
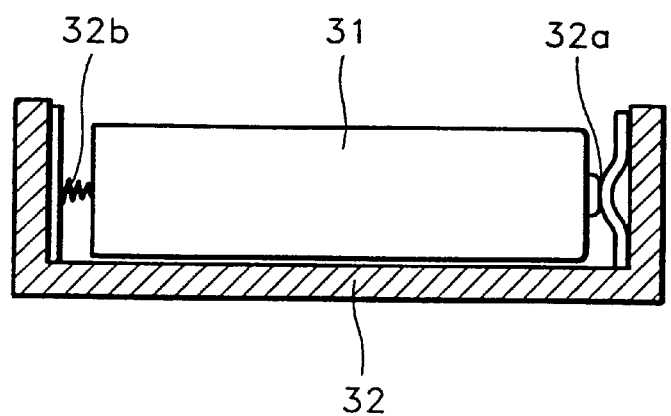
FIG. 2 is a view showing a state in which a conventional battery terminal case is used.
Figure 3:
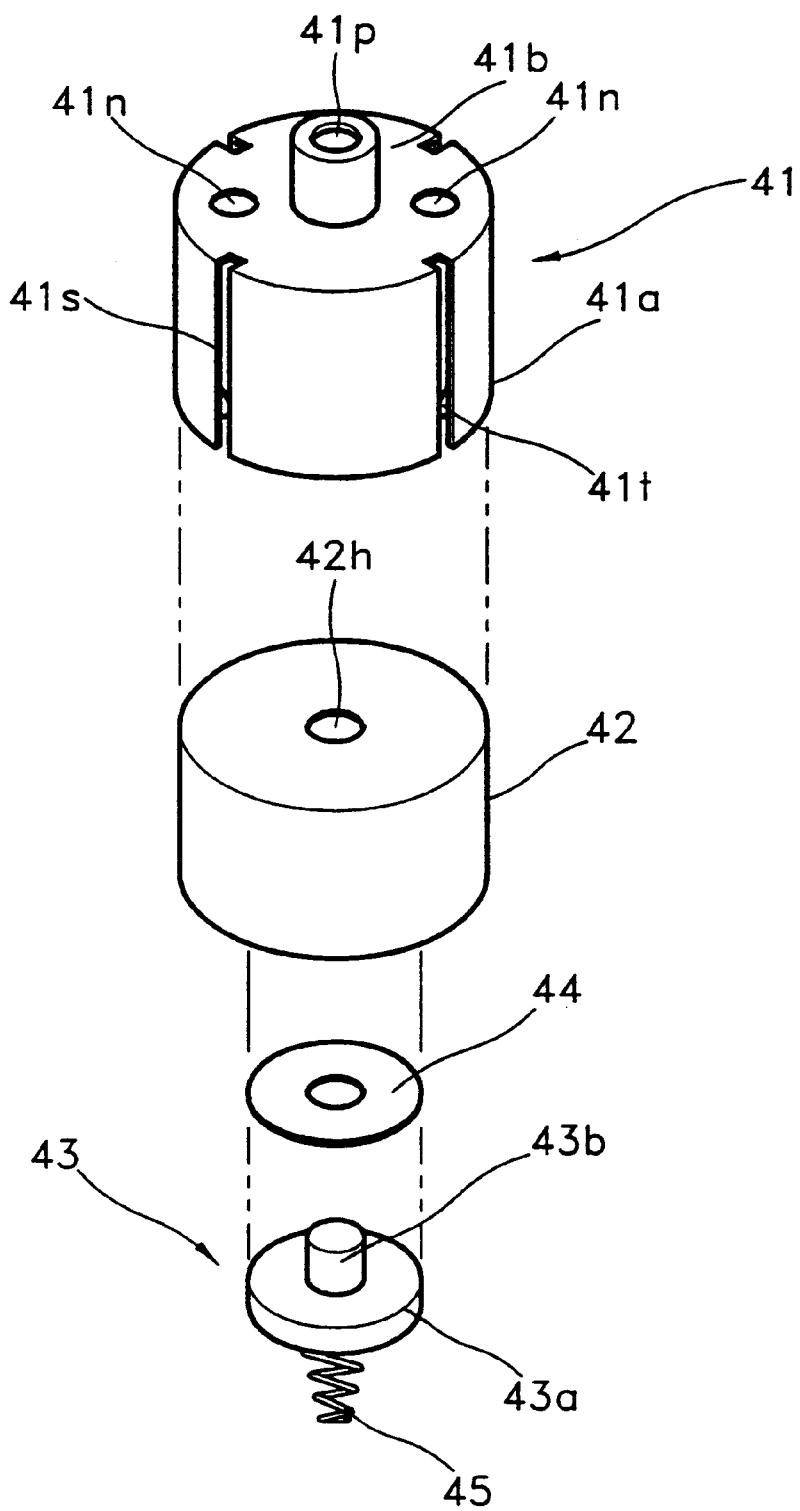
FIG. 3 is an exploded perspective view of a battery terminal case according to the present invention.

Referring to FIG. 3, a battery terminal case according to the present invention is comprised of an outer case 41 to be capped over an anode portion of a battery body (not shown), a cathode terminal extension member 42 inserted into and nested inside the outer case 41 to contact a cathode body of the battery, and an anode terminal extension member 43 inserted into the cathode terminal extension member 42 to contact the anode of the battery.

The outer case 41 includes a cylindrical main body portion 41a of which one end is open, and a cylindric auxiliary body portion 41b formed of a single body with the main body portion 41a and having a diameter relatively smaller than that of the main body portion 41a. A passing hole 41p for insertion of a jack or a cord (not shown) is formed on top of the auxiliary body portion 41b to electrically connect to the anode of the battery, and at least one passing hole 41p for the insertion of a jack or a cord (not shown) is formed in the main body portion 41a to electrically contact the cathode of the battery. Also, a protrusion 41t (see to FIG. 4) for coupling with an indented portion of the battery body is formed on the inner surface of the main body portion 41a.

In the main body portion 41a, a plurality of slits 41s are formed lengthwise so that a vertical wall of the main body portion 41a can be elastically deformed in a outward/inward direction within a predetermined range. Accordingly, when the cathode terminal extension member 42 is inserted into the external member 42, since the vertical wall of the main body 41a deforms outwardly, the cathode terminal extension member 42 can be easily inserted into the outer case 41. When the insertion of the cathode terminal extension member 42 into the outer case 41 is completed, the vertical walls of the main body portion 41a return to their initial positions and the cathode terminal extension member 42 can be secured inside the outer case 41. Here, it is preferable that the outer case 41 is manufactured of a plastic exhibiting superior insulation characteristics and elasticity.

Meanwhile, the cathode terminal extension member 42 has cylindric shape having an open end and is made of a metallic. A passing hole 42h for allowing the auxiliary body portion 43b of the anode terminal extension member 43 to pass therethrough is formed at the center of the upper surface of the cathode terminal extension member 42.

Figure 4:
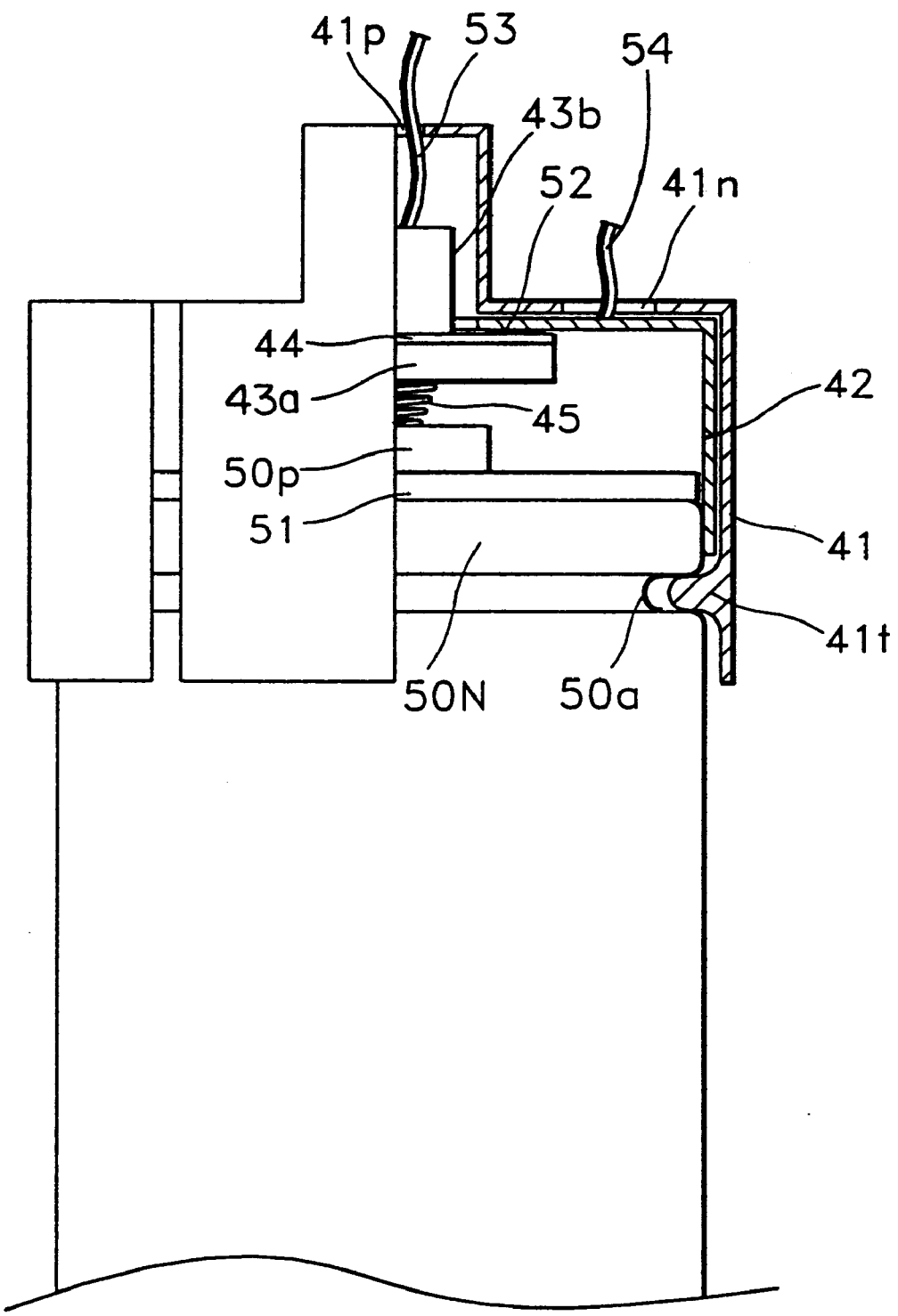
FIG. 4 is a partially cut-away sectional view illustrating a portion of the battery terminal case in use according to the present invention.

The anode terminal extension member 43 is manufactured of a metallic material and includes a disk-like main body portion 43a and a cylindric auxiliary body portion 43b. The auxiliary body portion 43b is formed integrally with the main body portion 43a, and to which the jack or the cord passing through a passing hole 41p formed in the auxiliary body portion 41b of the outer case 41 is connected. A compression spring 45 to directly contact the anode of the battery is installed at the bottom of the main body portion 43a. Also, an insulating ring member 44 for preventing an electrical short between the cathode terminal extension member 42 and the anode terminal extension member 43 is installed therebetween above the upper surface of the main body portion 43a. Alternatively, an insulating material such as $SiO_2$, instead of the ring member 44, can be coated on the upper surface of the main body portion 43a. FIG. 4 shows the battery terminal case having the structure according to the present invention, in which a battery is inserted into the assembled battery terminal case. As shown in the drawing, the battery terminal case of the present invention is coupled to enclose a portion of the outer circumferential surface of the battery 50 including an anode 50P. That is, the anode portion of the battery 50 inserts into the outer case 41 to enclose the outer circumferential portion of the battery 50. A recessed portion 50a is formed at the outer circumferential surface of the battery 50. The protrusion 41t formed at the inner surface of the outer case 41 elastically inserts into the recessed portion 50a so that the terminal case can be kept integrally with the battery 50. Here, the anode 50P of the battery 50 contacts the spring 45 combined with the anode terminal extension member 43 and a cathode can 50N electrically connected with the cathode (not shown) of the battery 50 contacts the cathode terminal extension member 42.

Also, an anode cord 53 passes through the passing hole 41p of the outer case 41 and is connected to the auxiliary body portion 43b of the anode terminal extension member 43, for example, by soldering. Meanwhile, a cathode cord 54 passes through the passing hole 41n of the outer case 41 and electrically contacts the cathode terminal extension member 42.

Here, it is preferable to attach the ring member 44 and the cathode terminal extension member 42 using an adhesive 52 to prevent the ring member 44 from escaping and to stably support the anode terminal extension member 43. Further, an additional insulating ring 51 can be installed at the upper portion of the battery 50 to prevent a short between the anode 50P and the cathode can portion 50N of the battery 50.

As described above, when the battery is inserted into the terminal case, since the anode cord 53 and the cathode cord 54 are positioned to be adjacent to each other in the same direction, the cords can be easily connected to thereby easily manufacture a battery pack. Furthermore, damage to the battery itself can be prevented since welding is not necessary. Since the anode and cathode extension members inside the case maintain stable contact with the respective anode and cathode of the battery, contact defects between the battery and the terminal in the conventional terminal case, occurring as the elastic force of the terminal weakens, can be prevented.

What is claimed is:

1. A battery terminal case comprising:

an outer case into which a battery is adapted to be inserted such that an anode terminal and a portion of a cathode can of a battery is enclosed;

a cathode terminal extension member inserted into and nested inside said outer case for contacting the portion of the cathode can;

an anode terminal extension member inserted into said cathode terminal extension member for contacting the anode terminal of said battery; and an insulating member mounted to electrically insulate the cathode and anode terminal extension members from each other.

2. A battery terminal case as claimed in claim 1, wherein a protruding portion is formed on an inner circumferential surface of said outer case to be inserted into and coupled with a recessed portion formed on an outer circumferential surface of said battery.

3. A battery terminal case as claimed in claim 2, wherein said outer case comprises a cylindrical main body portion having said protruding portion and wherein one end of said main body portion is open, and a cylindrical auxiliary body portion integrally formed with said main body portion and having a diameter smaller than said main body portion.

4. A battery terminal case as claimed in claim 3, wherein said main body portion includes a passing hole for allowing a jack or a cord to pass therethrough to be electrically connected to said cathode terminal extension member.

5. A battery terminal case as claimed in claim 3, wherein said auxiliary body portion includes a passing hole for allowing a jack or a cord to pass therethrough to electrically connect with said anode terminal extension member.

6. A battery terminal case as claimed in claim 3, wherein a plurality of slits are formed in said main body portion to enable vertical walls of said main body portion to elastically deform inward or outward.

7. A battery terminal case as claimed in claim 1, wherein said anode terminal extension member comprises a disc-shaped main body portion and a cylindrical auxiliary body portion integrally formed with said disc-shaped main body portion and directly connected to a jack and a cord passing through said cathode terminal extension member.

8. A battery terminal case as claimed in claim 7, wherein a compression spring adapted to directly contact the anode of said battery is installed at a bottom of said disc-shaped main body portion.

9. A battery terminal case as claimed in claim 7, wherein an insulating ring member to prevent shorts due to contact with said cathode terminal extension member is installed at an upper portion of said disc-shaped main body portion.

\* \* \* \* \*